(12) United States Patent
Albanese et al.

(10) Patent No.: US 11,930,046 B2
(45) Date of Patent: Mar. 12, 2024

(54) SYSTEM AND METHOD FOR DETERMINING VULNERABILITY METRICS FOR GRAPH-BASED CONFIGURATION SECURITY

(71) Applicant: Palo Alto Research Center Incorporated, Palo Alto, CA (US)

(72) Inventors: Massimiliano Albanese, Potomac, MD (US); Marc E. Mosko, Santa Cruz, CA (US)

(73) Assignee: Xerox Corporation, Norwalk, CT (US)

( * ) Notice: Subject to any disclaimer, the term of this patent is extended or adjusted under 35 U.S.C. 154(b) by 351 days.

(21) Appl. No.: 17/350,221

(22) Filed: Jun. 17, 2021

(65) Prior Publication Data

US 2022/0407891 A1    Dec. 22, 2022

(51) Int. Cl.
*H04L 29/00* (2006.01)
*H04L 9/40* (2022.01)

(52) U.S. Cl.
CPC ........ *H04L 63/205* (2013.01); *H04L 63/1433* (2013.01)

(58) Field of Classification Search
CPC .......................... H04L 63/205; H04L 63/1433
See application file for complete search history.

(56) References Cited

U.S. PATENT DOCUMENTS

| | | |
|---|---|---|
| 6,742,128 B1 | 5/2004 | Joiner |
| 7,013,395 B1 | 3/2006 | Swiler |
| 9,215,158 B1 | 12/2015 | Adogla |

(Continued)

FOREIGN PATENT DOCUMENTS

| | | |
|---|---|---|
| CN | 106991325 A | 7/2017 |
| CN | 106997437 A | 8/2017 |

(Continued)

OTHER PUBLICATIONS

Albanese, M., & Jajodia, S. (2017). A Graphical Model to Assess the Impact of Multi-Step Attacks. The Journal of Defense Modeling and Simulation. 79-93.

(Continued)

*Primary Examiner* — Don G Zhao
(74) *Attorney, Agent, or Firm* — Shun Yao; Yao Legal Services, Inc.

(57) ABSTRACT

A system is provided for determining vulnerability metrics for graph-based configuration security. During operation, the system generates a multi-layer graph for a system with a plurality of interconnected components. The system determines, based on the multi-layer subgraph, a model for a multi-step attack on the system by: calculating, based on a first set of variables and a first set of tunable parameters, a likelihood of exploiting a vulnerability in the system; and calculating, based on a second set of variables and a second set of tunable parameters, an exposure factor indicating an impact of exploiting a vulnerability on the utility of an associated component. The system determines, based on the model, a set of attack paths that can be used in the multi-step attack and recommends a configuration change in the system, thereby facilitating optimization of system security to mitigate attacks on the system while preserving system functionality.

20 Claims, 8 Drawing Sheets
(2 of 8 Drawing Sheet(s) Filed in Color)

(56) References Cited

U.S. PATENT DOCUMENTS

| | | | |
|---|---|---|---|
| 9,317,692 | B2 | 4/2016 | Elder |
| 9,684,865 | B1 | 6/2017 | Ezick |
| 9,705,978 | B1 | 7/2017 | Kenigsberg |
| 10,313,382 | B2 | 6/2019 | Noel |
| RE47,757 | E | 12/2019 | Hering |
| 10,516,761 | B1 | 12/2019 | A |
| 10,601,854 | B2* | 3/2020 | Lokamathe ......... H04L 63/1433 |
| 10,771,489 | B1 | 9/2020 | Bisht |
| 10,812,499 | B2 | 10/2020 | Hassanzadeh |
| 10,904,270 | B2 | 1/2021 | Muddu |
| 11,265,292 | B1 | 3/2022 | Leviseur |
| 2008/0104665 | A1 | 5/2008 | Naldurg |
| 2008/0172716 | A1 | 7/2008 | Talpade |
| 2009/0077666 | A1 | 3/2009 | Chen |
| 2009/0265199 | A1 | 10/2009 | Moerdler |
| 2010/0095381 | A1 | 4/2010 | Levi |
| 2010/0192195 | A1 | 7/2010 | Dunagan |
| 2013/0232331 | A1 | 9/2013 | Farhan |
| 2015/0058993 | A1* | 2/2015 | Choi ................ H04L 63/1433 726/25 |
| 2015/0244734 | A1 | 8/2015 | Olson |
| 2016/0050116 | A1 | 2/2016 | Sheshadri |
| 2016/0205122 | A1* | 7/2016 | Bassett ............. H04L 63/1416 726/23 |
| 2017/0034023 | A1 | 2/2017 | Nickolov |
| 2017/0177740 | A1 | 6/2017 | Abaya |
| 2017/0195349 | A1 | 7/2017 | Shabtai |
| 2017/0286690 | A1 | 10/2017 | Chari |
| 2017/0289187 | A1 | 10/2017 | Noel |
| 2017/0324768 | A1 | 11/2017 | Crabtree |
| 2018/0210927 | A1 | 7/2018 | Karam |
| 2018/0322407 | A1 | 11/2018 | Baum |
| 2019/0098039 | A1 | 3/2019 | Gates |
| 2020/0053116 | A1 | 2/2020 | Soroush |
| 2020/0110774 | A1 | 4/2020 | Lakshmanan |
| 2020/0137104 | A1* | 4/2020 | Hassanzadeh ...... H04L 63/1433 |
| 2020/0167705 | A1* | 5/2020 | Risoldi ............. G06Q 10/0635 |
| 2020/0175174 | A1 | 6/2020 | Bakalli |
| 2020/0177608 | A1 | 6/2020 | Okunlola |
| 2020/0177615 | A1* | 6/2020 | Grabois ............... G06F 21/577 |
| 2020/0177617 | A1* | 6/2020 | Hadar .................. G06F 21/577 |
| 2020/0177618 | A1* | 6/2020 | Hassanzadeh ........ G06F 21/552 |
| 2020/0244691 | A1* | 7/2020 | Veeramany ......... H04L 63/0236 |
| 2020/0311630 | A1* | 10/2020 | Risoldi ................. G06F 3/0482 |
| 2020/0412758 | A1* | 12/2020 | Trivellato ........... H04L 63/1441 |
| 2021/0012012 | A1* | 1/2021 | Soroush ............. H04L 63/1433 |
| 2021/0014065 | A1* | 1/2021 | Gourisetti ............. H04L 9/0637 |
| 2021/0014264 | A1 | 1/2021 | Soroush |
| 2021/0014265 | A1* | 1/2021 | Hadar .................. G06F 21/577 |
| 2021/0409439 | A1* | 12/2021 | Engelberg ............ H04L 63/145 |
| 2022/0014534 | A1* | 1/2022 | Basovskiy .......... H04L 63/1425 |
| 2022/0191230 | A1* | 6/2022 | Morgan ............. H04L 63/1425 |
| 2022/0263860 | A1 | 8/2022 | Crabtree |

FOREIGN PATENT DOCUMENTS

| | | |
|---|---|---|
| CN | 107038380 A | 8/2017 |
| CN | 107066256 A | 8/2017 |
| CN | 108123962 A | 6/2018 |
| CN | 110138788 A | 8/2019 |
| CN | 110188871 A | 8/2019 |
| CN | 110191120 A | 8/2019 |
| CN | 111611586 A | 9/2020 |
| CN | 112766374 A | 5/2021 |
| KR | 102079970 B1 | 4/2020 |
| WO | 0070463 A1 | 11/2000 |
| WO | 2007143226 A2 | 12/2007 |
| WO | 2019186722 A1 | 10/2019 |

OTHER PUBLICATIONS

Albanese, M., Pugliese, A., & Subrahmanian, V. (2013). Fast Activity Detection: Indexing for Temporal Stochastic Automaton-Based Activity Models. IEEE Transactions on Knowledge and Data Engineering, 360-373.

Bahl, P., Barham, P., & Black, R. (2006). Discovering Dependencies for Network Management. ACM HotNets.

BeyondTrust. (2018). Retina. Retrieved from Retina: https://www.beyondtrust.com/products/retina-network-security-scanner/.

CyVision. (2018). CyVision. Retrieved from CyVision: https://www.cyvisiontechnologies.com/.

GraphX. (2018). GraphX. Retrieved from GraphX: https://spark.apache.org/graphx/.

Leversage, D., & Byres, E. (2008). Estimating a system's mean time-to-compromise. IEEE Security & Privacy, 52-60.

Mitre. (2018). CVE. Retrieved from CVE: https://cve.mitre.org/.

MSR. (2018). Z3 Guide. Retrieved from Z3 Guide: https://rise4fun.com/z3/tutorialcontent/guide#h23.

Natarajan, A., Ning, P., Liu, Y., Jajodia, S., & Hutchinson, S. (2012). NSDMiner: Automated Discovery of Network Service Dependencies. IEEE INFOCOM.

NIST. (2018). Retrieved form https://nvd.nist.gov/.

OMG. (Mar. 2015). Data Distribution Service Specification Version 1.4. Retrieved from OMG DDS: https://www.omg.org/spec/DDS/About-DDS/.

RTI. (2017). RTI Routing Service. Retrieved from RTI Routing Service: https://rti.com/products/dds/routing-service.html.

SANS. (2002). SANS Institute, "Quantitative Risk Analysis Step-By-Step". Retrieved from Quantitative Risk Analysis Step-by-Step: https://www.sans.org/reading-room/whitepapers/auditing/quantitative-risk-analysis-step-by-step-849.

Schrecker, S., Soroush, H., & Molina, J. (2016). "Industrial Internet of Things vol. G4: Security Framework",. CreateSpace Independent Publishing Platform.

Soroush, H., Irey, P., & Pardo-Castellote, G. (2015). Next-Generation Cybersecurity for Advanced Real-Time Distributed Systems. Intelligent Ships Symposium.

StackOverflow. (2018). StackOverflow. Retrieved from StackOverflow: https://stackflow.com/.

Tenable. (2018). Nessus. Retrieved from Nessus: https://www.tenable.com/products/nessus/nessus-professional.

Venkatesan, S., Albanese, M., & Jajodia, S. (2015). Distributing Stealthy Botnets through Strategic Placement of Detectors. IEEE Conference on Communications and Network Security (IEEE CNS).

Venkatesan, S., Albanese, M., Cybenko, G., & Jajodia, S. (2016). A Moving Target Defense Approach to Disrupting Stealthy Botnets. ACM Workshop on Moving Target Defense (MTD).

Welsh, M. (2013). What I Wish System Researchers Would Work on. Retrieved from http://matt-welsh.blogspot.com/2013/05/what-i-wish-systems-researchers-would.html.

Xu, Tu., & Zhou, Y. (2015). Systems Approaches to Tackling Configuration Errors: A Survey. ACM Comput. Surv.

Gemini George, A Graph-Based Security Framework for Securing Industrial IoT Networks From Vulnerability Exploitations, IEEE Access (vol. 6, pp. 43586-43601), Jan. 1, 2018, 16 pages (Year: 2018).

Brigitte Boden, Mining Coherent Subgraphs in Multi-Layer Graphs with Edge Labels, Data Management and Data Exploration Group RWTH Aachen University, Germany, Proceedings of the 18th ACM SIGKDD international conference on Knowledge discovery and data mining, Aug. 2012 pp. 1258-1266 (Year: 2012).

Ibifubara Iganibo, Vulnerability Metrics for Graph-based Configuration Security, 2021, Center for Secure Information Systems, George Mason University, Fairfax, U.S.A. ,Palo Alto Research Center, Palo Alto, U.S.A, 12 pages (Year: 2021).

* cited by examiner

SYSTEM AND METHOD FOR DETERMINING VULNERABILITY METRICS FOR GRAPH-BASED CONFIGURATION SECURITY

STATEMENT OF GOVERNMENT-FUNDED RESEARCH

This invention was made with U.S. government support under (Contract Number) Award Number: FA8750-18-2-0147 awarded by the Defense Advanced Research Projects Agency (DARPA) of the Department of Defense (DoD). The U.S. government has certain rights in the invention.

RELATED APPLICATIONS

This application is related to:
U.S. Provisional Application No. 62/873,746, entitled "System and Method for Improving the Security Versus Functionality Tradeoff of a Composed Internet of Things System," by inventors Hamed Soroush and Shantanu Rane, filed 12 Jul. 2019, which subject matter is related to the subject matter in
U.S. patent application Ser. No. 16/219,774, entitled "Method for Improving the Security of a Networked System by Adjusting the Configuration Parameters of the System Components," by inventors Hamed Soroush and Shantanu Rane, filed 13 Dec. 2018 (hereinafter "U.S. patent application Ser. No. 16/219,774"), which application claims the benefit of
U.S. Provisional Application No. 62/718,328, titled "Method for Improving the Security of a Networked System by Adjusting the Configuration Parameters of the System Components," by inventors Hamed Soroush and Shantanu Rane, filed 13 Aug. 2018; and is further related to,
U.S. patent application Ser. No. 16/918,971, entitled "System and Method for Constructing a Graph-Based Model for Optimizing the Security Posture of a Composed Internet of Things System," by inventors Hamed Soroush, Milad Asgari Mehrabadi, and Shantanu Rane, filed on 1 Jul. 2020 (hereinafter "U.S. patent application Ser. No. 16/918,971"); and
U.S. patent application Ser. No. 16/923,763, entitled "System and Method for Reasoning about the Optimality of a Configuration Parameter of a Distributed System," by inventors Hamed Soroush and Shantanu Rane, filed on 8 Jul. 2020 (hereinafter "U.S. patent application Ser. No. 16/923,763"), the disclosures of which are herein incorporated by reference in their entirety.

BACKGROUND

Field

This disclosure is generally related to improving the security versus functionality tradeoff. More specifically, this disclosure is related to a system and method for determining vulnerability metrics for graph-based configuration security.

Related Art

As cyber systems become increasingly complex and connected, configuration analytics may play a critical role in the correct and secure operation of cyber systems or composed systems (e.g., a networked Industrial Control System (ICS) or an Internet of Things (IoT) system). Given the significant number of interconnected components in a composed system, providing the appropriate level of security for such networked systems may pose a challenge. For example, a majority of the security compromises in IoT systems can be attributed to misconfigurations, i.e., combinations of configuration parameters of the individual system components that expose vulnerabilities to an adversary. Attackers may rely on unpatched vulnerabilities and configuration errors to gain unauthorized access to system resources. Misconfigurations can occur at any level of a system's software architecture. Thus, correctly configuring systems can become increasingly complex given multiple interconnected systems.

Current solutions may focus narrowly on tuning the configuration parameters of individual system components. However, the current solution which work on minimizing an attack surface of a system lack a principled approach to managing the complex relationships between the configuration parameters of the many components of a composed system, and do not leverage the complex relationships among the configuration parameters of the individual system components. These solutions do not account for the dependencies among the configuration parameters of the interconnected system components or devices. Furthermore, current solutions do not provide a principled approach to account for the effect of configuration parameters on the attack sequences that are available to an adversary, nor do they consider functional dependencies between the interconnected system components or devices. This limitation prevents existing metrics from accurately measuring a system's attack surface. An inaccurate assessment of a system's susceptibility to attacks may then result in adopting inadequate countermeasures, which can have negative effects on the overall security of the system.

SUMMARY

The embodiments described herein provide a system and method for determining vulnerability metrics for graph-based configuration security. During operation, the system can generate a multi-layer graph for a system with a plurality of interconnected components. The multi-layer graph can include a configuration subgraph, a vulnerability subgraph, and a dependency subgraph. The system can determine, based on the multi-layer subgraph, a model for a multi-step attack on the system by calculating, based on a first set of variables and a first set of tunable parameters, a likelihood of exploiting a vulnerability in the system; and calculating, based on a second set of variables and a second set of tunable parameters, an exposure factor indicating an impact of exploiting a vulnerability on the utility of an associated component. The system can then determine, based on the model, a set of attack paths that can be used in the multi-step attack. In addition, the system can recommend, based on the set of attack paths, at least one configuration change in the system, thereby facilitating optimization of system security to mitigate attacks on the system while preserving system functionality.

In a variation of this embodiment, a component includes one or more of: a software component; a hardware component; a middleware component; and a networking component.

In a variation on this embodiment, the system can compute, based on the first set of variables and the first set of tunable parameters, the likelihood of exploiting the vulnerability in the system by using an extensible formula with one or more numerator factors and one or more denominator factors. The one or more numerator factors corresponds to a first subset of variables in the first set of variables that contribute to increasing the likelihood of exploiting the respective vulnerability which is denoted as:

$$(1-e^{-c_N \cdot f_N(x_N)});$$

wherein $c_N$ denotes a tunable parameter; $x_N$ denotes a variable; and $f_N(x_N)$ denotes a function of variable $x_N$. Furthermore, one or more denominator factors corresponding to a second subset of variables in the first set of variables that contribute to decreasing the likelihood of exploiting the respective vulnerability is denoted as:

$$e^{-c_D \cdot f_D(x_D)};$$

wherein $c_D$ denotes a tunable parameter; $x_D$ denotes a variable; and $f_D(x_D)$ denotes a function of variable $x_D$.

In a further variation on this embodiment, the system can determine, based on the likelihood of exploiting the respective vulnerability in the system, a probability value. The probability value can represent a label for an edge between two vulnerabilities in the vulnerability subgraph. The label can indicate a relative probability with which the edge or attack path will be traversed in an attack or by an attacker while exploiting the next vulnerability in the multi-step attack. The vulnerability subgraph can include directed edges between pairs of vulnerability subgraph nodes. A first vulnerability subgraph node can include a set of directed edges to a corresponding subset of vulnerability subgraph nodes. A respective directed edge from the first vulnerability subgraph node to a node in the subset of vulnerability subgraph nodes can indicate a probability of exploiting the second vulnerability subgraph node.

In a further variation on this embodiment, a set of probabilities corresponding to the set of directed edges represents a probability distribution over the set of directed edges and an attack or an attacker will select one or more of the directed edges to exploit a next vulnerability subgraph node in the subset of vulnerability subgraph nodes.

In a variation on this embodiment, the system can compute, based on the second set of variables and the second set of tunable parameters, the exposure factor indicating the impact of exploiting the vulnerability on utility of the associated component by using the following formula:

$$ef(v, h, x) = \frac{0.1 \cdot \text{Impact}(v)}{e^{c \cdot f(x)}};$$

wherein v denotes a vulnerability being exploited; h denotes a component in the system; Impact (v) denotes a first variable representing an impact score; x denotes a second variable; $e^{c \cdot f(x)}$ denotes a factor contributing to the exposure factor; c denotes a tunable parameter to weight the contribution of the factor $e^{c \cdot f(x)}$ to the exposure factor; and $f(x)$ is a function of variable x. A directed edge from a vulnerability subgraph node to a dependency subgraph node indicates the exposure factor. Further, the impact of exploiting the vulnerability on the associated component can result in a decrease in utility of the component in the system.

In a further variation on this embodiment, the first set of tunable parameters and the second set of tunable parameters can be adapted based on an application and an operational context of the system. A respective tunable parameter associated with a respective variable can be adjusted to weight a contribution of the respective variable to an overall score.

In a further variation on this embodiment, the system can display, on a screen of a user device, one or more interactive elements which can allow the user to: view the constructed multi-layer graph comprising at least: the configuration subgraph and the generated configuration subgraph nodes; the vulnerability subgraph and the generated vulnerability subgraph nodes; the dependency subgraph and generated dependency subgraph nodes; and directed edges between nodes in a same subgraph or between nodes in different subgraphs; select one or more attack paths; and view an impact of the one or more attack paths executed sequentially or executed concurrently.

In a further variation on this embodiment, the first set of variables can include one or more of: a set of known intrusion detection system rules associated with the vulnerability; an amount of time elapsed since information about vulnerability became public; and a Common Vulnerability Scoring System exploitability score.

In a further variation on this embodiment, the second set of variables can include one or more of: a number of deployed intrusion detection system rules; and a normalized Common Vulnerability Scoring System impact score.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1:
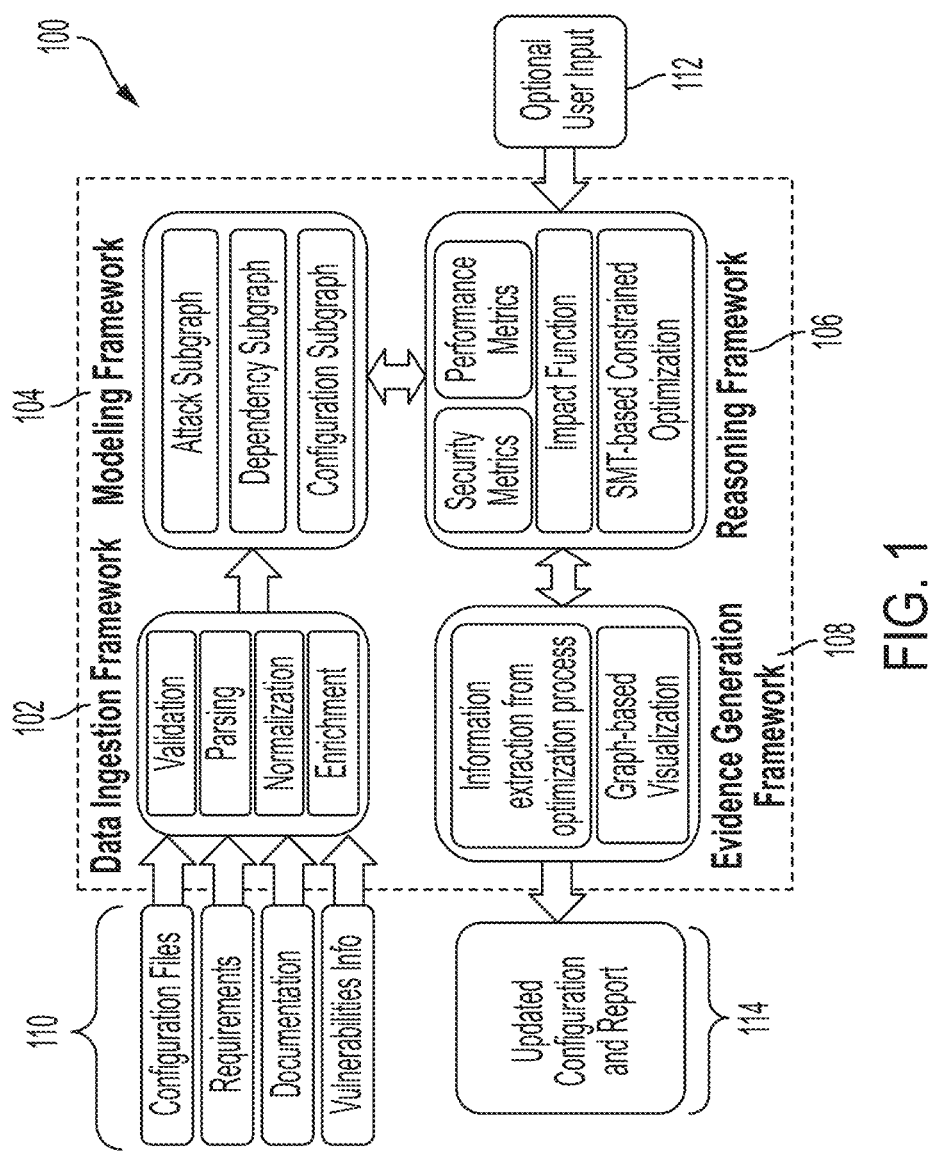
FIG. 1 illustrates an exemplary environment for facilitating an improvement in the security versus functionality tradeoff of a composed system, in accordance with an embodiment of the present application.

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown but is to be accorded the widest scope consistent with the principles and features disclosed herein.

Overview

The embodiments described herein solve the technical problem of determining vulnerability metrics for graph-based configuration security. Specifically, a system and method are provided that can determine a set of vulnerability metrics to enable practical and effective application of graph-based configuration analysis and optimization to mitigate multi-step attacks on a networked system.

In a graph-based analysis, including vulnerability graphs in analyzing the vulnerability of the system can be an essential tool for modeling potential multi-step attacks and assessing an overall system's attack surface. For example, the overall system can be modeled using a "Secure Configurations for the IoT Based on Optimization and Reasoning on Graphs" (or "SCIBORG"). The overall system based on SCIBORG can model a composed system by constructing a multi-layer graph (described in U.S. patent application Ser. No. 16/219,774) with a plurality of components. The multi-layer graph can include: a dependency subgraph, a configuration subgraph, and an attack or vulnerability subgraph modeling the vulnerabilities of the system.

The embodiments described herein provide a method for determining the set of vulnerability metrics to quantifying several relevant aspects of the overall system being modeled. Some of the aspect can include an exploitation likelihood of a vulnerability which represents a probability with which an attacker may attempt to exploit the vulnerability when certain pre-conditions are satisfied. The pre-conditions may vary depending on specific characteristics of each vulnerability, as certain configuration settings may prevent access to vulnerable parts of a target software. The system can also determine exposure factors of system components to vulnerabilities.

The system may identify several variables that influence an attacker's decision to exploit a given vulnerability. In one embodiment, the system can provide a novel model that can account for variables that can be considered as relevant to modeling multi-step attacks. Further, the system may determine probability distributions over edges of a vulnerability subgraph in a multi-layer graph based on SCIBORG to model how an attacker may select the next target exploit in a multi-step attack.

Specifically, the embodiments described herein, provide a general and extensible formal approach to assess the exploitation likelihood that an attacker will attempt to exploit a vulnerability and the impact that a successful exploitation would have on the system components. Further, the system can apply Intrusion Detection System (IDS) rules in the computation of both the exploitation likelihood and the impact. Therefore, the system may determine a set of metrics to quantify the above-mentioned aspects of the system to complement the SCIBORG's graphical model and label different types of edges in the system generated graph models; thereby facilitating optimization of system security to mitigate attacks on the system while preserving system functionality.

The term "overall system" refers to SCIBORG, which includes four frameworks (i.e., data ingestion framework, modeling framework, reasoning framework, and evidence generation framework). The terms "reasoning framework" and "reasoning module" are used interchangeably in this disclosure and refer to one of the four frameworks of the overall system or SCIBORG.

The terms "vulnerability graph" and "attack graph" are used interchangeably in this disclosure and refer to one of the three subgraphs of the generated multi-layer graph.

The terms "graph" and "subgraph" are used interchangeably in this disclosure to describe the three graphs or subgraphs which make up the generated multi-layer graph of the described embodiments, i.e., the configuration graph or subgraph; the vulnerability graph or subgraph; and the dependency graph or subgraph.

System Architecture

FIG. 1 illustrates an exemplary environment for facilitating an improvement in the security versus functionality trade-off of a composed system, in accordance with an embodiment of the present application. Environment 100 can depict or indicate the overall system or SCIBORG. The overall system can include a data ingestion framework 102, a modeling framework 104, a reasoning framework 106, and an evidence generation framework 108.

Data ingestion framework 102 can determine information sources associated with software, hardware, middleware, and networking components of a system, and can further receive data from those information sources as input (e.g., input 110 which can include configuration files, functional requirements, documentation, and vulnerabilities information).

Modeling framework 104 of the overall system can construct a multi-layer graph for a system with a plurality of components. The components can include, e.g., a software component, a hardware component, a middleware component, and a networking component. The constructed multi-layer graph can include a configuration subgraph, a vulnerability subgraph, and a dependency subgraph. Modeling framework 104 can construct the multi-layer graph by generating nodes in each of the three subgraphs as well as directed edges between nodes in a same graph or between nodes in different subgraphs.

In the configuration subgraph, modeling framework 104 can generate nodes in a first class and a second class. The nodes in the first class can encode information associated with a configuration parameter for a respective component. Examples of the encoded information can include: a name for the respective component; a default value for the respective component; a range of values for the respective component; and a data type for the respective component. The nodes in the second class can encode value assignments for configuration parameters and relationships between configuration parameters, including: relationships among configuration parameters within components; and relationships among configuration parameters across components.

In the vulnerability subgraph, modeling framework 104 can generate nodes by identifying and encoding three types of vulnerabilities. First, modeling framework 104 can identify and encode known vulnerabilities associated with a component as a first set of known vulnerabilities, which are obtained from a public or a proprietary database (e.g., from the National Vulnerability Database (NVD) or an IoT search engine such as Shodan). Modeling framework 104 can also identify both bad security practices and best security practices, e.g., based on expert domain knowledge or user input. Modeling framework 104 can encode the bad security practices as a second set of known vulnerabilities and can encode a negation of the best security practices (i.e., "not-best security practices") as a third set of known vulnerabilities.

In the dependency subgraph, modeling framework 104 can generate nodes, wherein each node represents a respective component of the system and is labeled with a dependency type and a number representing a value associated with the respective component. An exemplary multi-layer graph which includes the three subgraphs along with their respective nodes and directed edges is described below in relation to FIGS. 2B and 3.

Reasoning framework 106 can obtain or take as input the multi-layer graph constructed by the modeling framework for a system with a plurality of components. Reasoning framework 106 can also receive an optional user input 112. Reasoning framework 106 can determine constraint relationships associated with configuration parameters for the components. These constraint relationships can include security constraints and functionality constraints, as described below. The overall system can implement reasoning framework 106 by using a solver, such as Satisfiability Modulo Theory (SMT) solver, to determine configurations which minimize the security impact to the overall system while satisfying configuration constraints and preserving the functionality of the overall system. Reasoning framework 106 can also determine configurations which optimize or prioritize functionality constraints over security constraints, depending on a chosen "constraint relaxation strategy" (or "strategy") described in U.S. patent application Ser. No. 16/923,763. This strategy can be one of three strategies and can be chosen by a user or configured by the system based on an operational context of the overall system.

Reasoning framework 106 can establish security metrics (e.g., the probability of compromise) and performance metrics (e.g., availability, throughput, etc.), and devise a cost function based on these metrics. An exemplary method of solving the optimization problem (e.g., of finding a set of configuration parameters that both reduces the attack surface and preserves the functionality of the system) is described in U.S. patent application Ser. No. 16/219,774.

Evidence generation framework 108 can use as input the output of reasoning framework 106, and evidence generation framework 108 can produce as output an updated configuration and report 114.

Specifically, the overall system can be implemented with a scalable pipeline, which can: ingest system requirements, configuration files, software documentation and various types of configuration vulnerabilities (data ingestion framework 102); based on the data ingested in the data ingestion framework, build a queryable, graph-based representation of the relationships between configuration vulnerabilities and attack scenarios, configuration parameters, and system components (modeling framework 104); provide an application programming interface (API) to perform a quantitative, comparative analysis of the security impact of configuration settings (reasoning framework 106); automatically construct a constraint satisfaction problem based on the model and utilize a Z3 SMT solver to solve for optimal parameter values (reasoning framework 106); and provide human readable evidence about the optimality of the selected configuration (evidence generation framework 108).

Exemplary Network Diagram and Corresponding Multi-Layer Graph

Figure 2A:
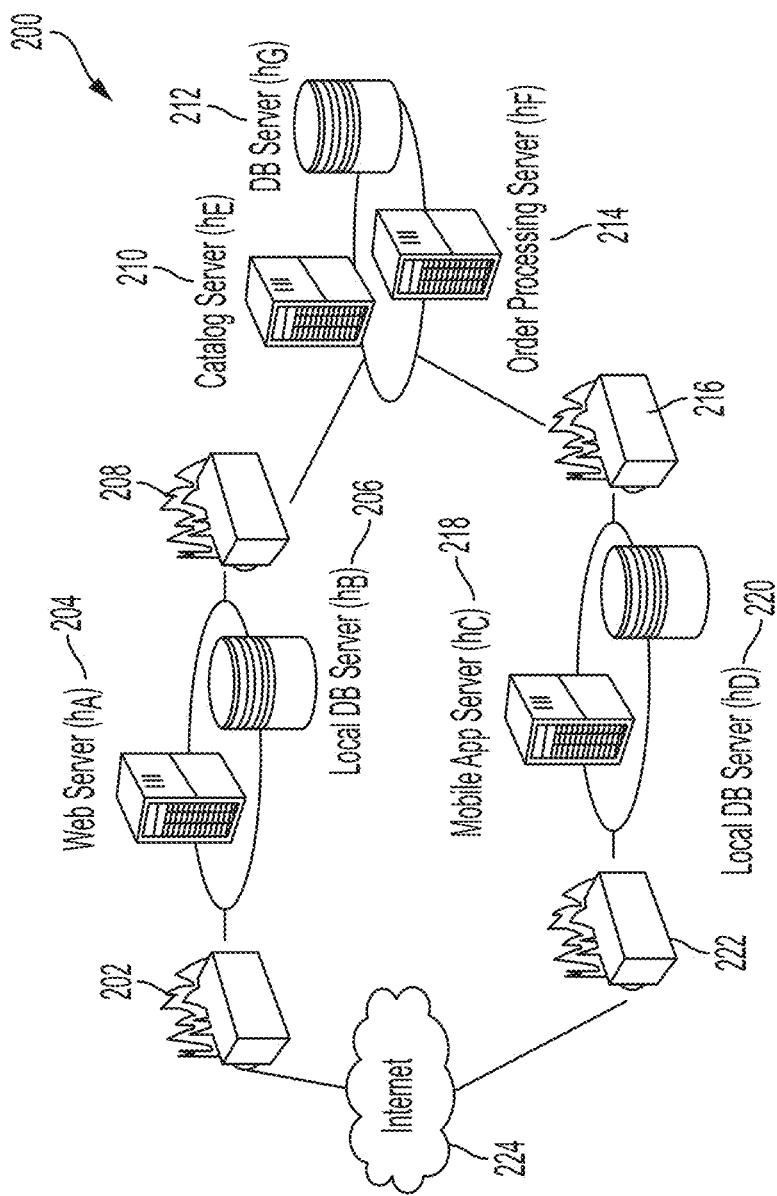
FIG. 2A illustrates an exemplary network diagram of an e-commerce system, in accordance with an embodiment of the present application.

FIG. 2A illustrates an exemplary network diagram of an e-commerce system, in accordance with an embodiment of the present application. Diagram 200 can include clusters or groups of entities separated by firewalls and connected via a network 224 (e.g., the internet). For example, a first set of entities can include a Web Server 204 ($h_A$) and a Local Database Server 206 ($h_B$). The first set of entities can be separated by a firewall 208 from a second set of entities, which can include a Catalog Server 210 ($h_E$), a Database Server 212 ($h_G$), and an Order Processing Server 214 ($h_F$).

The second set of entities can be separated by a firewall 216 from a third set of entities, which can include a Mobile Application Server 218 ($h_C$) and a Local Database Server 220 ($h_D$). The third set of entities can be separated by a firewall 222 from network or internet 224, and the first set of entities can be separated by a firewall 202 from network or internet 224. Entities in a same or different group may be dependent upon each other, as depicted below in relation to FIG. 2B.

Figure 2B:
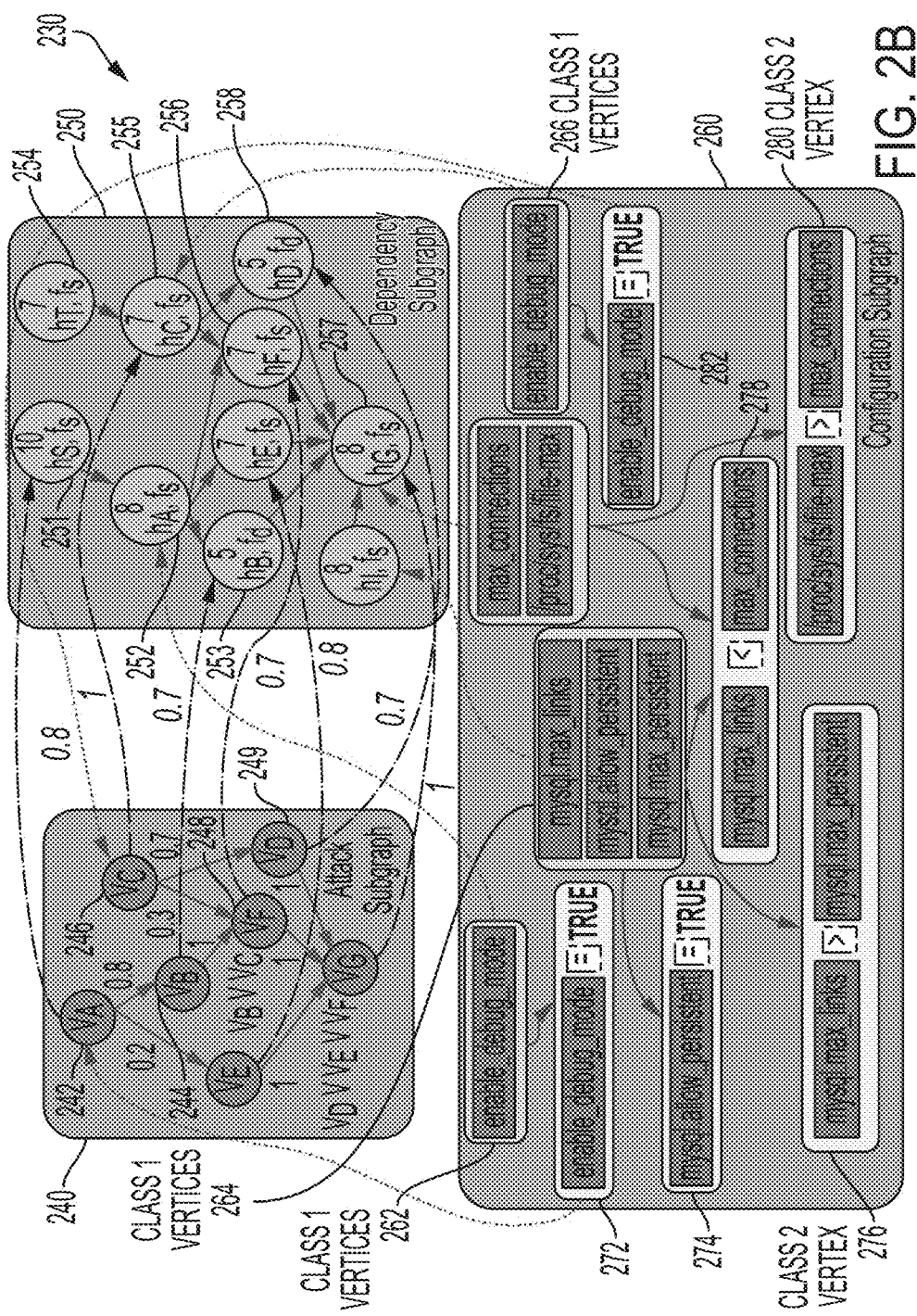
FIG. 2B illustrate an exemplary multi-layer graph corresponding to the network diagram of FIG. 2A, in accordance with an embodiment of the present application.

FIG. 2B illustrates an exemplary multi-layer graph corresponding to the network diagram of FIG. 2A, in accordance with an embodiment of the present application. SCIBORG's approach representing a distributed system (shown in FIG. 2A) is based on modeling the distributed system as a three-layer directed graph 230 encoding of the available information required to perform reasoning on the optimality of system configurations. Graph 230 can include an attack subgraph 240, a dependency subgraph 250, and a configuration subgraph 260.

As described above, modeling framework 104 of FIG. 1 can use the ingested data from data ingestion framework 102 to construct a three-layer directed graph that efficiently encodes the information needed for computing optimal configurations. A first layer can include a dependency subgraph, a second layer can include a configuration subgraph, and a third layer can include an attack subgraph. The edges between these three subgraphs can determine the functional composition and the attack surface for a configuration set, as described in detail below.

A change in configuration associated with one component in a system can impact the security and functionality of other components. Therefore, globally optimal security decisions rely on dependency information. SCIBORG can ingest dependency information to generate a dependency subgraph. As shown in FIG. 2B, the dependency subgraph (subgraph 250) represents the functional dependencies between components of the target composed system. In this subgraph, each vertex or node represents a functional component of the system, e.g., a host, a service, etc., and carries a utility value. Each vertex also has a label identifying one of three dependency types, as described below. Each directed edge in the dependency subgraph represents a functional dependency between two components, as specified by the dependency label of the parent vertex.

To capture a wide range of relationships between components, SCIBORG can model each dependency as a function of the form, $$f:[0,1]^n \to [0,1],$$

with $f(0, \ldots, 0)=0$ and $f(1, \ldots, 1)=1$. Each component can have an intrinsic utility value and the dependency function can define the ability of the component to provide the expected utility based on a status of the other components on which it depends. A dependency function can return "1" when the component can provide 100% of its utility; and can return "0" when the component has been completely compromised. In SCIBORG, different types of dependency relationships can be identified which include and are not limited to redundancy ($f_r$), strict dependence ($f_s$), and graceful degradation ($f_d$). These dependency relationships are specified by a dependency label in each node in the dependency subgraph (subgraph 250). In the example shown in FIG. 2B, an edge from $h_A$ to $h_B$ can denote that $h_A$ depends on $h_B$. Further, each component in the dependency subgraph (subgraph 250) can be labeled with a type of dependency and a utility value.

The configuration subgraph (subgraph 260) represents relationships between configuration parameters, both within any system component and across different components of the composed system. There are two classes of vertices in the configuration subgraph: a first class of nodes or "Class 1" vertices capture per-component configuration parameters; and a second class of nodes or "Class 2" vertices capture relationships among (or conditions on) the configuration parameters. These relationships are specified by functional system requirements and admissibility of the configuration setting, as described below. Furthermore, some of the relationships between the configuration parameters enable or disable preconditions for system vulnerabilities, which can result in inducing a particular attack subgraph for that configuration. Similar to these relationships among configuration parameters, a particular parameter assignment can also create a precondition for a vulnerability which can be exploited, thus providing an entry point into the attack subgraph.

For example, configuration subgraph 260 can include Class 1 vertices 262, 264, and 266, where each group of Class 1 vertices is depicted in pink-colored box and corresponds to configuration parameters for a specific component depicted in dependency subgraph 250. In other words, directed edges from a component in dependency subgraph 250 to Class 1 vertices in configuration subgraph 260 identify the configuration parameters associated with that component. Furthermore, configuration subgraph 260 can include Class 2 vertices 272, 274, 276, 278, 280, and 282, where each respective Class 2 vertex is depicted in its own beige-colored box and corresponds to a configuration constraint between configuration parameters (whether between configuration parameters within a same component or across different components), such as the configuration parameters indicated by Class 1 vertices 262-266. Edge from Class 1 vertices and a Class 2 vertices identify parameters involved in a constraint.

The attack subgraph (subgraph 240) also known as vulnerability subgraph represents the propagation of potential multi-step attacks on components in the dependency graph for a particular configuration. In attack subgraph 240, each vertex represents a vulnerability. An edge in the attack subgraph indicates that exploiting a vulnerability (a node at the start of a first green-colored arrow) can set the stage for the attacker to exploit the next vulnerability (a node at the end of the first green-colored arrow). Each edge is also labeled with a probability value, representing the probability of the attack progressing along that edge. In other words, the probability value can indicate a most likely path that an attacker might take in a multi-step attack. Determining these edge probabilities in vulnerability subgraph 240 can be challenging as the system has to take into consideration that vulnerabilities that require more resources, time, and skill are less likely to be exploited. One of the embodiments described in the present disclosure, provide a novel approach for determining these edge probabilities. The nodes and edges in attack subgraph 240 are described below.

Figure 3:
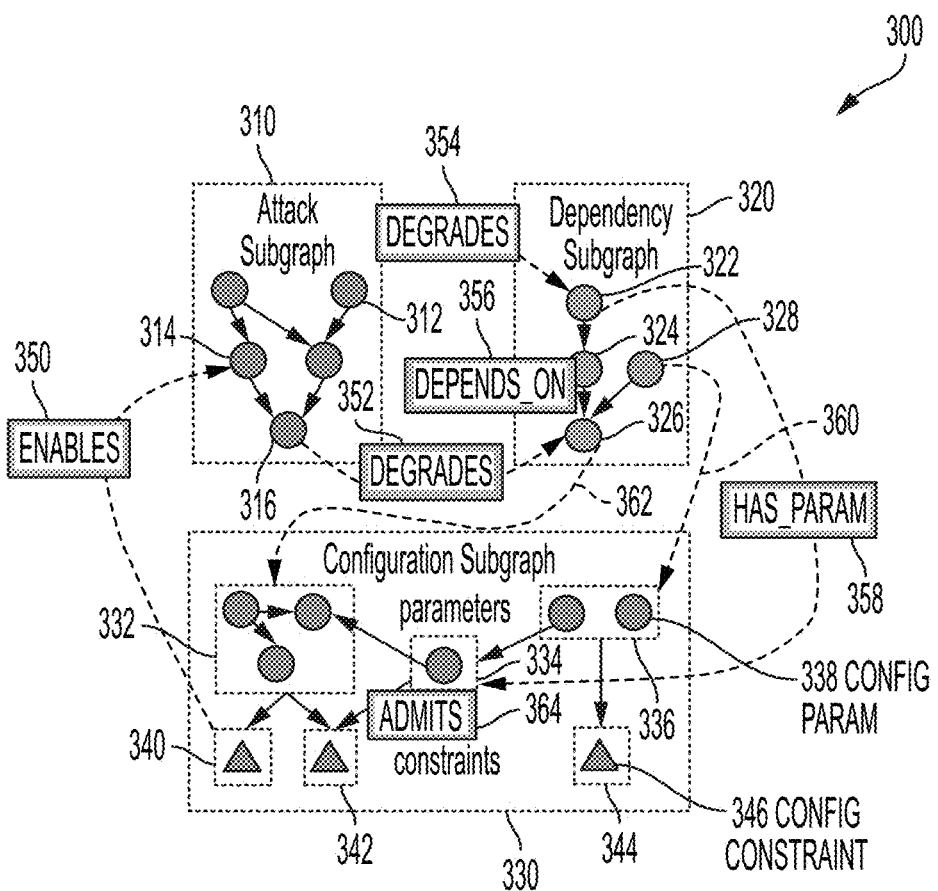
FIG. 3 illustrates an exemplary high-level diagram of a multi-layer graph, including semantics of the relationships among subgraphs, in accordance with an embodiment of the present application.

FIG. 3 illustrates an exemplary high-level diagram of a multi-layer graph, including semantics of the relationships among subgraphs, in accordance with an embodiment of the present application. Diagram 300 can include: an attack subgraph 310, with each vulnerability node depicted as a red-colored circle, and relationships between vulnerability nodes depicted as black arrows; a dependency subgraph 320, with each component node depicted as a blue-colored circle, and relationships between component nodes depicted as black arrows; and a configuration subgraph 330, with configuration parameters depicted as green-colored circles and configuration constraints depicted as green-colored triangles.

Configuration subgraph 330 can include two types of nodes or vertices, as described above in relation to FIG. 2B. "Class 1" vertices capture per-component configuration parameters, e.g., the green-colored circles in boxes 332, 334, and 336. For example, box 336 includes a configuration parameter 338, which is a Class 1 vertex. "Class 2" vertices capture relationships among (or conditions on) the configuration parameters, e.g., the green-colored triangles in boxes 340, 342, and 344. For example, box 344 includes a configuration constraint 346, which is a Class 2 vertex.

In configuration subgraph 330, relationships within and across components are depicted as black arrows between the green-colored circles, while constraints between and among the components are depicted as black arrows between the Class 1 vertices and the Class 2 vertices.

Furthermore, configuration subgraph 330 indicates several semantics regarding the relationships of the nodes within each subgraph as well as the relationships of the nodes across subgraphs, e.g., via directed edges. For example, a configuration constraint 340 enables (350, indicated by a purple dashed arrow) a vulnerability 314. An edge between two vulnerabilities, i.e., from a first vulnerability to a second vulnerability, can also be referred to as an enables edge which indicates that exploiting the first vulnerability can create the preconditions for exploiting the second vulnerability.

A vulnerability 316 degrades (352, indicated by a purple dashed arrow) or represents the exposure factor of the component indicated by a dependency subgraph node 326 based on the exploitation of vulnerability 316. Similarly, a vulnerability 312 degrades (354, indicated by a purple dashed arrow) or represents the exposure factor of the component indicated by a dependency subgraph node 322 based on the exploitation of vulnerability 312. In other words, a degrades edge 354 from vulnerability subgraph node 312 to dependency subgraph node 322 indicates that exploitation of vulnerability 312 can impact a component 322 to an extent quantified by an exposure factor.

In addition, dependency subgraph node 324 depends on (356, indicated with a black arrow) dependency subgraph node 326. Dependency subgraph node 322 is associated with or has parameters (358, indicated by a purple dashed line) indicated in a node of Class 1 vertices 334 (e.g., configuration parameters associated with the component represented by dependency subgraph node 322). Similarly, dependency subgraph node 328 is associated with or has parameters (360, indicated by a purple dashed line) indicated in a node of Class 1 vertices 336 (e.g., configuration parameters 338 associated with the component represented by dependency subgraph node 328). Similarly, dependency subgraph node 326 is associated with or has parameters (362, indicated by a purple dashed line) indicated in a node of Class 1 vertices 332 (e.g., configuration parameters associated with the component represented by dependency subgraph node 326).

Moreover, a configuration subgraph node of Class 1 vertex 334 identifies or admits (364, indicated with a black arrow) the relationship of the configuration parameters involved in the configuration constraint of Class 2 vertex 342.

Therefore, SCIBORG can model a composed system by constructing a multi-layer graph (described in FIGS. 2A, 2B, and 3) for a system with a plurality of interconnected components. SCIBORG multi-layer graph represents a security exposure of a system based on how the system has been configured. SCIBORG can facilitate the minimization of a potential impact of possible attacks by analyzing the paths in the vulnerability subgraph that an adversary may traverse in a multi-step attack to achieve a well-defined goal, e.g., exfiltrating sensitive information from a database. SCIBORG can evaluate the impact resulting from such attacks. Traditional approaches minimize the attack surface of a system by, for example, minimizing the number of exploitable resources available to an adversary. SCIBORG prevents or mitigates the attacks with the highest potential security impact.

In one embodiment, the system can provide a novel approach to estimate the weights associated with the edges, i.e., for the enables edges and the degrades edges, between any two vulnerabilities in vulnerability subgraph 310 (or 240 in FIG. 2B) and an exposure factor associated with the edges from vulnerability nodes to nodes in dependency graph 320 (or 250 in FIG. 2B). Specifically, the system can determine a set of robust metrics to augment the SCIBORG model with a capability of quantifying different aspects of the overall system being modeled. In the following, the set of robust SCIBORG metrics and a novel approach to determine them are described.

Exemplary SCIBORG Metrics and Multi-Step Attack Model

For a vulnerability in a system to become a susceptible target for exploitation by a malicious user, a defender system can depend on a number of variables which can include features associated with the vulnerability and characteristics of potential attackers. Some of the existing approaches consider the skills and resources available to different types of attackers, but such approaches are not of practical use as it is desirable that defenders operate under worst-case assumptions. In other words, it is desirable that the defenders assume that they are addressing skilled and well-equipped attackers. Therefore, in one embodiment, the system takes into consideration the features of the vulnerabilities and information that may be available to potential attackers, e.g., information that could influence their selection of target exploits, irrespective of their skills. Based on this information the system can determine which possible attack on the system is to be prioritized and how to protect the system from this possible attack by providing recommendations for optimizing some of the configuration settings in the system.

Given that an opportunity exists to exploit a vulnerability, the probability with which an attacker may attempt to exploit the vulnerability can be referred to as an exploitation likelihood (or simply likelihood). An attacker may have an opportunity to exploit a vulnerability when certain preconditions are satisfied, e.g., the attackers may have managed to gain access to a vulnerable host. However, certain configuration settings in the overall system may prevent access to vulnerable portions of the target software, meaning that depending on specific characteristics of each vulnerability, the associated pre-conditions for exploiting the respective vulnerability may vary.

One embodiment identifies a set of variables that represent relevant factors influencing an attacker's decision to exploit a given vulnerability. The set of variables can include and are not limited to a vulnerability's exploitability score (determined by a Common Vulnerability Scoring System (CVSS)); an amount of time elapsed since information about the vulnerability became public; and a number of known Intrusion Detection system (IDS) rules associated with the vulnerability.

The CVSS score can be calculated based on three different metrics: base score metrics, temporal score metrics, and environmental score metrics. The embodiment described herein, take into consideration the base score metrics. The computation of the base score metrics involves the following equations:

$$BaseScore = (0.6*I + 0.4*E - 1.5)*f(I) \qquad (1)$$

$$I = 10.41*(1-(1-I_C)*(1-I_I)*(1-I_A)) \qquad (2)$$

$$E = 20*AC*A*AV \qquad (3)$$

$$f(I) = \begin{cases} 0, & \text{if } I = 0 \\ 1.176, & \text{otherwise} \end{cases} \qquad (4)$$

where I denotes Impact scores which is defined in equation (2); E denotes exploitability scores defined in equation (3); and the function $f(I)$ is defined in equation (4). The impact score, I, quantifies the consequences of an exploit and the exploitability score indicates the ease with which a vulnerability can be exploited. The terms $I_C$, $I_I$, and $I_A$ in equation (2) represent confidentiality, integrity, and availability impact scores, respectively. The terms AC, A, and AV in equation (3) represent different exploitability metrics, namely, access complexity (AC), authentication (A), and access vector (AV), respectively.

The AV metric reflects the context in which a vulnerability can be exploited. The AV metric value is high for vulnerabilities that can be exploited remotely. This is because the number of potential attackers that can exploit a vulnerability remotely is larger than the number of potential attackers who could exploit a vulnerability that requires physical access to a vulnerable host. The AC metric reflects the amount of effort and resources required for a successful attack. A high value for the AC metric indicates that exploiting a vulnerability may require little or no effort and hence such vulnerabilities are more likely to be exploited.

The amount of time elapsed since information about the vulnerability became public is also an important variable in determining the likelihood of exploiting a vulnerability. For example, if a vulnerability is known for a long time, then a greater number of exploits can be developed by a hacker community. This is because the hacker community had enough time to develop an approach to exploit the known vulnerability. Although the likelihood that patches are developed for the vulnerability increases with time, these patches are often not deployed in a timely manner and/or may not be consistently applied across affected systems, thereby giving the attackers an opportunity to exploit the known vulnerability.

Another variable that is relevant for determining the likelihood of exploiting a vulnerability is the number of known IDS rules. The term "known IDS rules" refers to IDS rules that are available to the community through public accessible repositories. The existence of known IDS rules associated with a given vulnerability may decrease the likelihood of exploiting that vulnerability. This is because attackers may prefer to target vulnerabilities that can be exploited without triggering IDS alerts. Specifically, the number of known IDS rules may influence an attacker's choice of vulnerabilities to exploit. For example, some systems may expose multiple vulnerabilities and attackers may choose to avoid exploits that the system can easily detect based on the known IDS rules. In other words, there can be different types of attackers, e.g., high-end attackers and low-end attackers. The low-end attackers may try to exploit every vulnerability in the system while the high-end attackers may be cautious about which vulnerability to exploit without revealing to the system what has been hacked. Therefore, the inclusion of the known IDS rules in determining the likelihood of exploiting a vulnerability is a novel and relevant feature to model the type of attack based on the type of the attacker. A novel formulation of the likelihood of exploiting a vulnerability based on the above-mentioned variables is described in the following paragraphs.

Let G~=(V,E) denote a vulnerability subgraph of a SCI-BORG model. In a vulnerability subgraph each node represents one vulnerability. However, such a representation may have problems with scalability as there can be large number of vulnerabilities which can be in the order of thousands, e.g., 18000 vulnerabilities across all components in the system. Some of the vulnerabilities may share similar features in terms of CVSS scores. Therefore, in one embodiment, the system may group the vulnerabilities by components, and partition the groups based on impact level and an AV metric associated with the CVSS score. The system may then further group the vulnerabilities into remote vulnerabilities and local vulnerabilities. The system may aggregate the vulnerabilities in each such grouping and generate a single node in the vulnerability subgraph to represent the group of nodes or vulnerabilities, thereby providing a compact and scalable vulnerability graph for further analysis.

Based on the above-mentioned variables that are relevant in determining the likelihood of exploiting a vulnerability, i.e., the CVSS score; an amount of time elapsed since information about the vulnerability became public; and the number of known IDS rule, an exploitation likelihood function $\rho: V \rightarrow [0,1]$, can be represented as $$\rho(v) = \frac{\left(1 - e^{-\alpha \cdot \sqrt{t(v)}}\right) \cdot \left(1 - e^{-\beta \cdot Expoitability(v)}\right)}{e^{\gamma \cdot IDS_k(v)}} \quad (5)$$

where $t(v)$ denotes the time since vulnerability v was discovered, ·Expoitability(v) represents the CVSS exploitability score of v, and $IDS_k(v)$ denotes the set of known IDS rules associated with v. The exploitation likelihood score $\rho(v)$ assigned to a vulnerability v corresponds to a property of the vulnerability v and can be independent of the other vulnerabilities that exist in the system.

The exploitation likelihood, $\rho(v)$, of a vulnerability v can be defined as a probability that an attacker may attempt to exploit that vulnerability give an opportunity. In other words, while computing the likelihood, $\rho(v)$, the system may not take into account the context in which the vulnerabilities are exploited. Attackers usually engage in multi-step attacks when attempting to penetrate a complex networked system. One embodiment can model such a multi-step attack with vulnerability graphs (described above in relation to FIGS. 2B and 3). At every step in a multi-step attack, the attacker may have several options in terms of vulnerabilities to exploit a next vulnerability to advance the attack. The system can apply the SCIBORG multi-layer graph model to model this analogy applied by the attackers in a multi-step attack. In the following an extensible formula that reflects this analogy is described.

Each variable in equation (5) can contribute to the overall likelihood as a multiplicative factor between "0" and "1" which can be formulated to account for diminishing returns. Factors included in the numerator of a formulation and that are responsible for contributing to the increase in the likelihood of exploitation can be of the form, $$1 - e^{-c_N \cdot f_N(x_N)} \quad (6)$$

where $x_N$ is a variable, $f_N( )$ is a function such that $x_{N1} < x_{N2} \rightarrow f_N(x_{N1}) < f_N(x_{N2})$, and $c_N$ denotes a constant or a tunable parameter. The function $f_N( )$ can also include the operations involved in grouping and aggregating the vulnerabilities in each group (as already described). Similarly, factors figure in the denominator of a formulation and these factors can be responsible for contributing to the decrease in the likelihood of exploitation can be of the form, $$e^{-c_D \cdot f_D(x_D)} = \frac{1}{e^{c_D \cdot f_D(x_D)}}. \quad (7)$$

Such a formulation (shown in equation (6) and (7)) can provide the following practical advantages: (i) the resulting likelihood is normalized between "0" and "1"; (ii) accounting for the effect of additional independent variables would be straightforward; and (iii) ignoring the effect of a variable would simply entail setting the constant, i.e., $c_D$ or $c_N$, such that the corresponding factor evaluates to "1".

The functions, i.e., $f_N( )$ and $f_D( )$, in equations (6) and (7) can in most cases be defined as a linear function, i.e., $f(x)=x$, but for formulating a time t since the vulnerability was known, the function $f( )$ can be defined as $f(t)=\sqrt{t}$ to model a less-than-linear relationship. In one embodiment, the system can provide a general and a formal approach to assess the likelihood that an attacker may attempt to attack a vulnerability. In other words, equation (5) can be extended to take into account additional variables that can contribute to determining the exploitation likelihood of a vulnerability. Further, the system can adjust one or more parameters in equation (5) to vary the contribution of the variables existing in equation (5), e.g., if the contribution of the known IDS rules is to be ignored then the weight or parameter $\gamma$ can be set to "0." The effect of the known IDS rules on the likelihood of exploiting a vulnerability for different settings of $\gamma$ is described in relation to FIG. 4 below.

Figure 4:
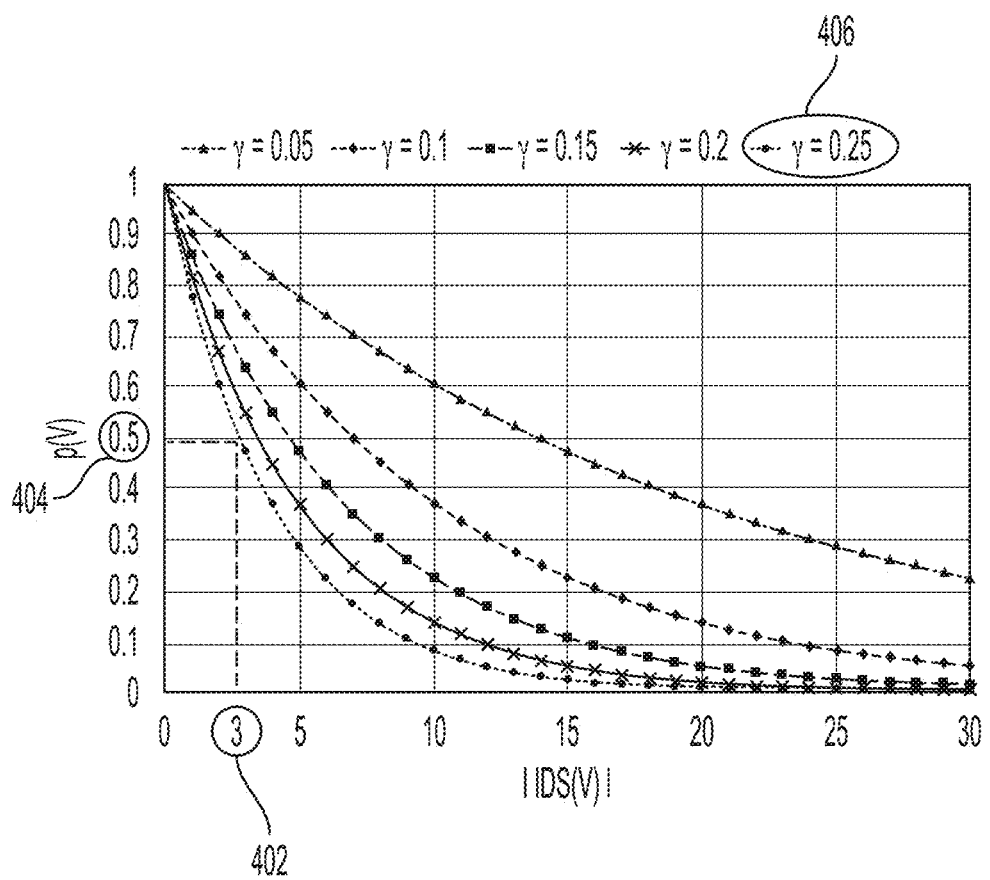
FIG. 4 shows an exemplary plot illustrating the effect of known IDS rules on the likelihood of exploiting a vulnerability for different weights, in accordance with an embodiment of the present application.

FIG. 4 shows an exemplary plot illustrating the effect of known IDS rules on the likelihood of exploiting a vulnerability for different weights, in accordance with an embodiment of the present application. Specifically, the example plot shown in FIG. 4 illustrates the effect of $IDS_k(v)$ (i.e., the known IDS rules) on the likelihood defined in equation (5) for different values of a tunable parameter $\gamma$. For example, when $\gamma=0.25$ (406 in FIG. 4), the existence of three known IDS rules (indicated by 402) associated with a vulnerability v can reduce the likelihood of exploiting v approximately in half (indicated by 404). Therefore, when the system includes the contribution of know IDS rules the likelihood of exploiting a vulnerability decreases, thereby indicating that the system can easily mitigate such vulnerabilities.

Figure 5:
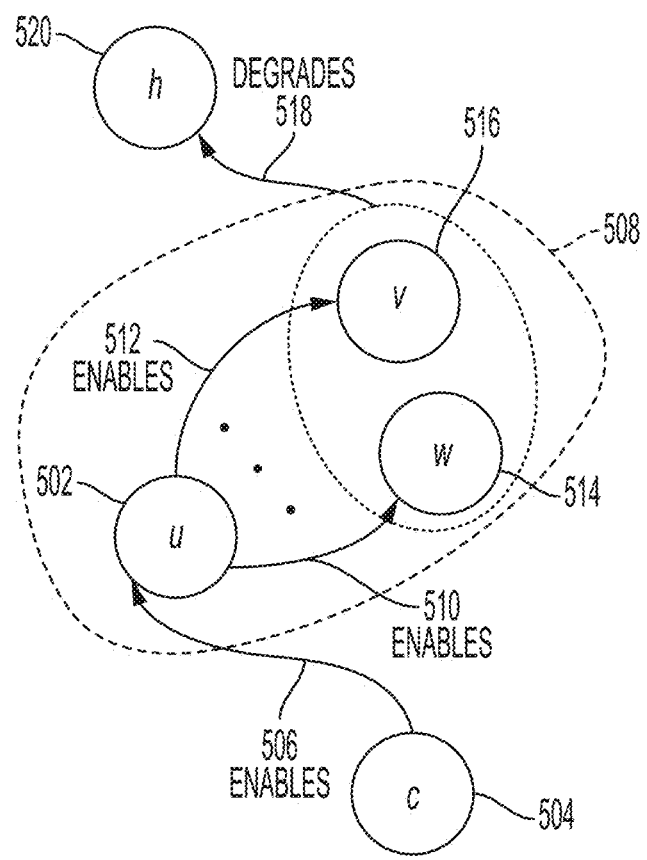
FIG. 5 shows an exemplary portion of a vulnerability subgraph illustrating likely attack paths, in accordance with an embodiment of the present application.

FIG. 5 shows an exemplary portion of a SCIBORG multi-layer graph model illustrating likely attack paths, in accordance with an embodiment of the present application. The example shown in FIG. 5, illustrates possible multi-step attack paths taken by an attacker. For example, the enables edge 506 can indicate that the attacker may exploit a vulnerability, u (502), associated with a node 504 in the configuration subgraph of the multi-layer graph. Next, for each node in the vulnerability subgraph 508, the system can compute a probability distribution over outgoing enables edges, i.e., edges 510 and 512, from node 502. Each node in vulnerability subgraph 508 can be associated with an exploitation likelihood defined in equation (5). Further, the vulnerability likelihood at each node, i.e., defined by equation (5), includes the relevant variables that can influence the attacker's choice of vulnerabilities to exploit. Based on the vulnerability likelihood, the system can determine a probability label for corresponding enables edges. Specifically, the system may first normalize the likelihood values of enabled vulnerabilities and apply the normalized values to label the corresponding enables edges, i.e., edges 510 and 512. For example, given an enables edge 512 (which can be represented by $e_{u \to v}=(u,v)$), the probability of exploiting v (516) after u (502) has been exploited can be defined as $$Pr(e_{u \to v}) = \frac{\rho(v)}{\sum_{v' s.t.(u,v') \in E} \rho(v')} \quad (8)$$

Similarly, given an enables edge 510 (which can be represented by $e_{w \to u}=(u,w)$), the probability of exploiting w (514) after exploiting u (502) can be defined as $$Pr(e_{u \to w}) = \frac{\rho(w)}{\sum_{w' s.t.(u,w') \in E} \rho(w')} \quad (9)$$

In this manner, the system can compute different probability labels for different edges between any two nodes in the vulnerability subgraph, thereby providing a probability distribution across the edges in the vulnerability subgraph and the system can determine a likely path among these edges the attacker may select for advancing an attack. These probability labels across the edges are normalized so that the sum of the probability distribution across the edges between two vulnerabilities is equal to one. Equations (8) and (9) represent a standard weighted normalized probability value. Alternatively, a user of the system may also specify an arbitrary normalization factor.

The probability label on each edge in the vulnerability graph can be proportional to the exploitation likelihood of the destination vulnerabilities. The system can apply a similar reasoning to any enables edge between a constraint (Class 2 node) in the configuration subgraph and a vulnerability in the vulnerability subgraph, e.g., enables edge 506 between node 504 in the configuration subgraph and node 502 in the vulnerability subgraph 508 which can also be represented by $e_{c \to u}=(c,u)$.

In one embodiment, the system can determine a relative damage to an asset in the overall system which was caused due to the exploitation of a vulnerability. In the risk analysis terminology, this relative damage can be termed as an exposure factor (EF). Some of the factors influencing the EF can include the CVSS impact score (which takes into consideration the impact on confidentiality, integrity, and availability) and a number of deployed IDS rules that can potentially mitigate the consequences of an exploit. The term "deployed IDS rules" refers to IDS rules that are being actively used by a deployed IDS. Deployed IDS rules can include a subset of known IDS rules and rules developed by the system's administrator. The IDS rules deployed on the system may not be publicly known. The attacker may not be aware of what deployed IDS rules are in use in the system. Therefore, the deployed IDS rules do not affect the likelihood of exploiting a vulnerability (defined in equation (5)) and hence the known IDS rules $IDS_k(v)$ and the deployed IDS rules $IDS_d(v)$ can be different.

For a given degrades edge 518 (v,h) or (w,h), the EF can be defined as $$ef(v, h) = \frac{0.1 \cdot \text{Impact}(v)}{e^{\delta \cdot IDS_d(v)}} \quad (10)$$

The impact score, Impact(v), can range from "0" to "10", the "0.1" factor in equation (10) can normalize the impact score range, i.e., normalized to a range from "0" to "1."

The system can ignore the effect of the deployed IDS rules by setting δ to "0". However, when the system considers the effect of deployed IDS rules, the impact of the vulnerability with multiple deployed IDS rules can be significantly reduced, thereby indicating that the system can easily mitigate such vulnerabilities.

When the number of IDS rules deployed on the system $IDS_d(v)$ increases, the impact of exploiting the vulnerability, v, decreases. This is because with a greater number of deployed IDS rules the system can detect and may also mitigate the attack on the system. Therefore, the exposure factor in equation (10) is formulated in a manner so that it depends on the properties of the system, e.g., the number of deployed IDS rules for the system. Equations (5)-(10) can provide two relevant insights into the problem of system security, first, to determine whether or not an attacker may exploit a vulnerability (equation (5)); second, to determine the impact if the vulnerability is exploited (equation (10)). Therefore, if an attacker exploits a vulnerability, v, the system can determine based on equation (10) the percentage of damage caused to an associated component in the system. For example, if the exposure factor in equation (10) is "0.5", this can indicate that the associated component affected by the vulnerability may lose "50%" of its utility or "50%" of its utility is compromised.

Equation (10) can be extended to consider other relevant variables that can contribute to determining the impact of the attack on the system. For example, similar to including deployed IDS rules, equation (10) can also accommodate Intrusion Prevention System (IPS) rules. To prevent an attack on the system the IPS can turn-off an access control rule or may shutdown a Transmission Control Protocol (TCP) packet flow or may perform other actions to prevent the attack. Therefore, when a system includes an IDS and an IPS, equation (10) can include provisions to accommodate them, e.g., the parameter (can be adjusted to vary the contribution of•$IDS_d(v)$ to the exposure factor.

The notation ef(v,h) can be redundant because each node v in the vulnerability subgraph can represent a specific instance of a known vulnerability that can exist on a specific component. If multiple components have the same vulnerabilities, this case can be represented through multiple nodes in the vulnerability subgraph and with an association of one node per component.

Some of the embodiments described herein provide a system that can determine likely paths an attacker would follow (which is determined based on the exploitation likelihood equation (5) and the enables edge probability label in equations (8) and (9)). The system can then determine an amount of security damage done to a component by the attack. For example, every component in the overall system has a certain utility and the amount of utility lost is computed as exposure factor*utility. The SCIBORG system may select, based on the exploitation likelihood, the exposure factor, and the lost utility, a constraint that incurs minimum security damage and may relax this selected constraint.

Further, the metrics defined in equations (5) and (10) include a number of tunable parameters, i.e., $\alpha$, $\beta$, and $\gamma$ in equation (5), and parameter $\delta$ in equation (10). As already explained in relation to equation (5) and (10), the system can set these parameters to ignore the effect of one or more variables from the overall computation. Further, the system can apply these parameters to weight the contribution of different variables to the overall score. Therefore, the system may tune these parameters to adapt to a specific application and operational context.

Therefore, the system can separately model the exploitation likelihood and the impact of a vulnerability based on the metrics defined in equations (5)-(10). Furthermore, the system can provide a flexible approach to consider multiple variables and can adjust weights corresponding to these variables based on a specific application and operational context. Moreover, since the system computes an overall score (or SCIBORG score) based on vulnerability-level metrics, the system can allow the analysis of the security of the system at a finer level of granularity.

Figure 6:
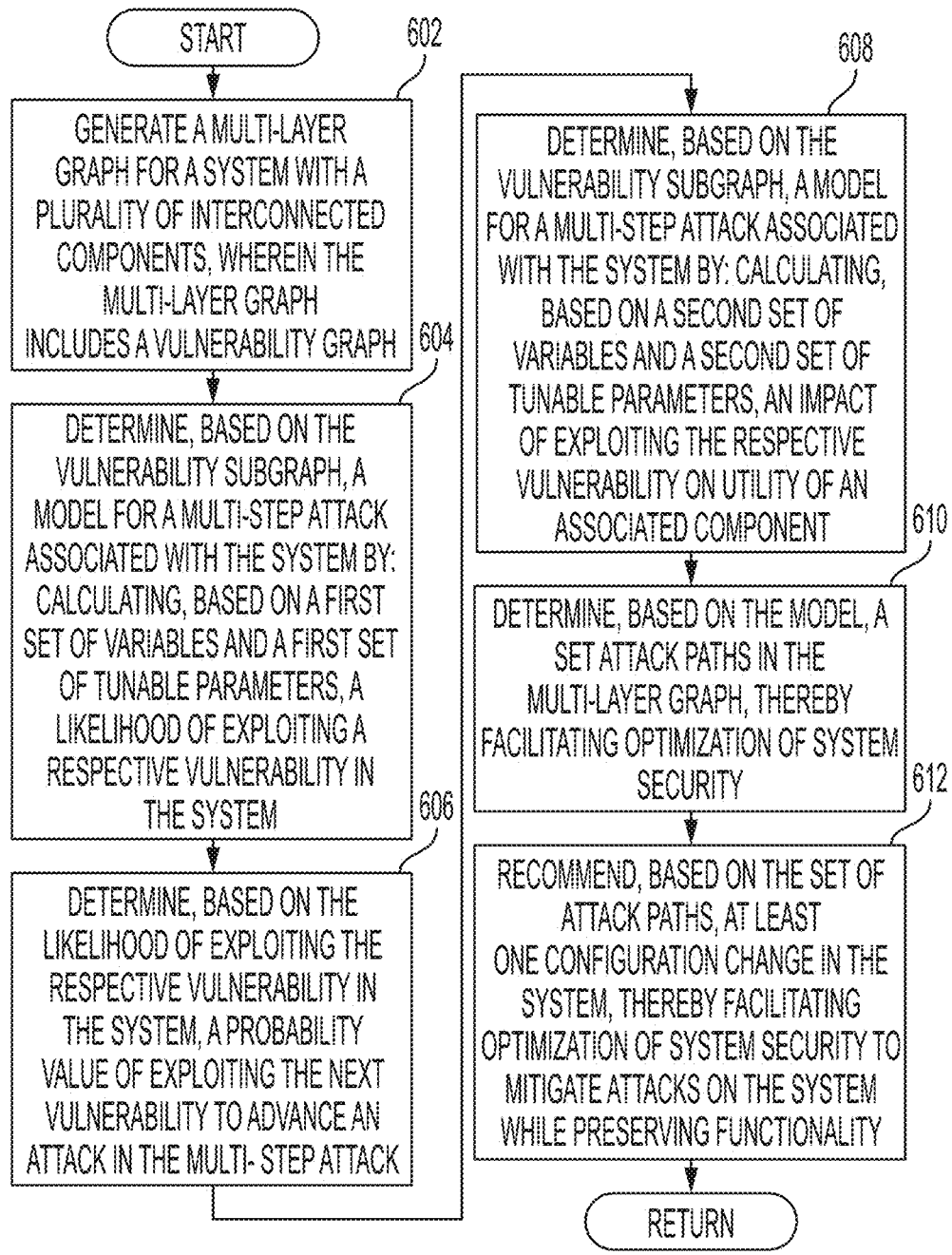
FIG. 6 presents a flow chart illustrating a method for determining vulnerability metrics for graph-based configuration security, in accordance with an embodiment of the present application.

FIG. 6 presents a flow chart illustrating a method for determining vulnerability metrics for graph-based configuration security, in accordance with an embodiment of the present application. During operation, the system can obtain a multi-layer graph representing an overall system with a plurality of interconnected components (operation 602). The multi-layer graph can include a configuration subgraph, a vulnerability subgraph, and a dependency subgraph. The system can determine, based on the vulnerability subgraph, a model for a multi-step attack of the system. Specifically, the system can calculate, based on a first set of variables and a first set of tunable parameters, a likelihood of exploiting a respective vulnerability in the overall system using equations (5)-(7) (operation 604). The first set of variables can include a set of known IDS rules associated with a vulnerability (which is denoted as $IDS_k(v)$ in equation (5)); an amount of time elapsed since information about a vulnerability became public (denoted as $t(v)$ in equation (5)); and other relevant variables that contribute to the likelihood of exploiting the vulnerability. The first set of tunable parameters can correspond to $\alpha$, $\beta$, and $\gamma$ in equation (5). Based on a specific application and operational context, these tunable parameters can be adjusted to weight the contribution of the corresponding variables to the likelihood of exploiting the vulnerability.

In response to determining the likelihood of exploiting a vulnerability in the overall system, the system may determine a probability value which indicates the probability that an attacker may exploit another vulnerability which is next in the order to advance an attack in the multi-step attack (operation 606). Further, the probability value can represent a label for an enables edge between two vulnerabilities in the vulnerability subgraph, and wherein the label indicates a likelihood with which the edge or attack path will be traversed in an attack or by an attacker while exploiting the next vulnerability in the multi-step attack.

While determining the model for the multi-step attack, the system can also calculate, based on a second set of variables and a second set of tunable parameters, an impact of exploiting the respective vulnerability on utility of an associated component (operation 608). The second set of variables can include and is not limited to a number of deployed IDS rules (which is denoted as $IDS_d(v)$ in equation (10)); and a normalized CVSS impact score (indicated by Impact (v) in equation (10). The second set of tunable parameters can be applied to weight a contribution of one or more factors or variables to the impact of exploiting the respective vulnerability on the utility of the associated component.

In response to determining the model for the multi-step attack associated with the overall system, the system can determine a set of MOST likely attack paths an attacker may select (operation 610). The system can then modify, based on the set of likely attack paths, at least one configuration change in the system (operation 612) and the operation returns. Therefore, by modeling the multi-step attack, the system can facilitate optimization of system security and can also mitigate attacks with high impact on the utility of a component in the overall system.

Exemplary Distributed Computer System

Figure 7:
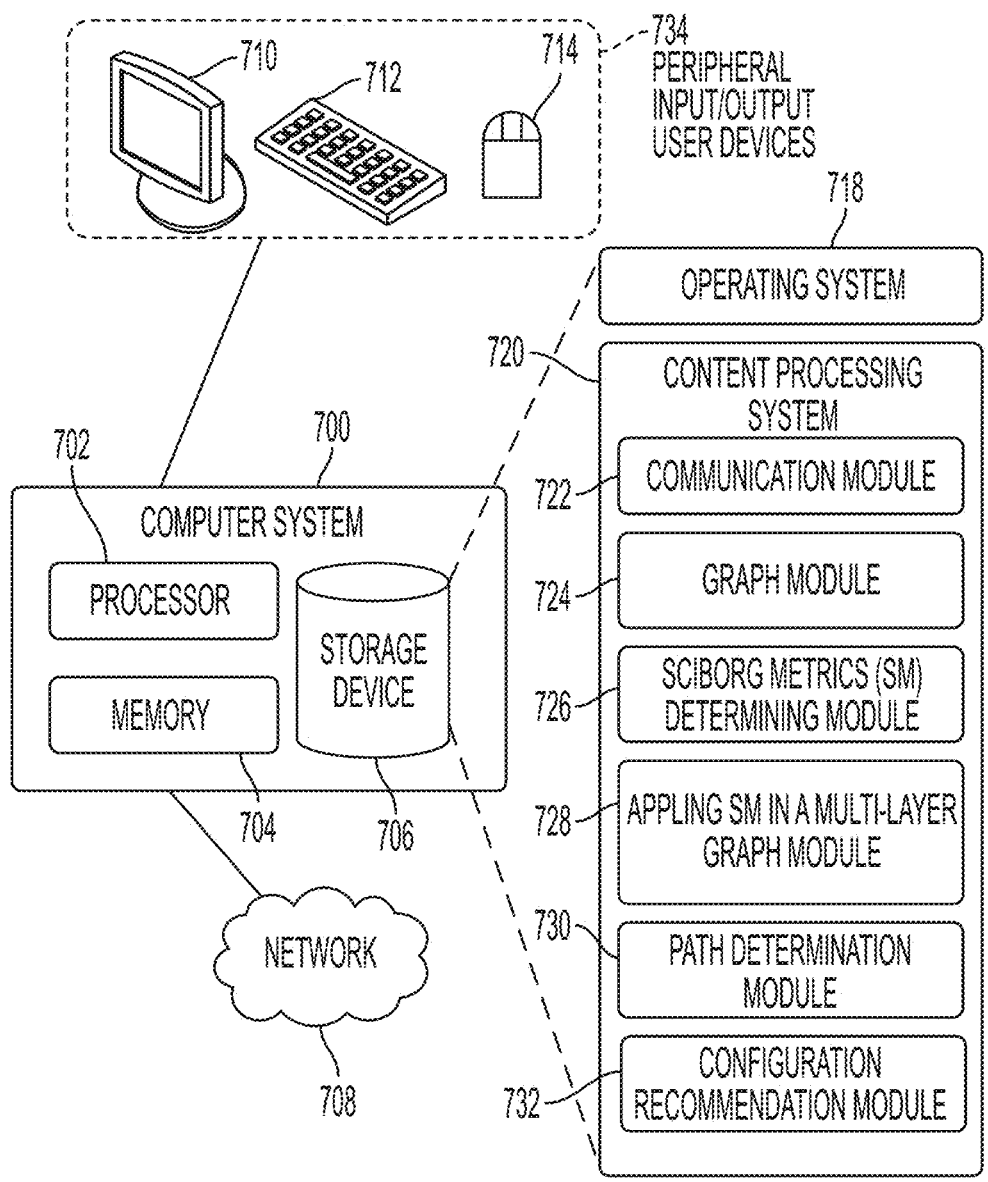
FIG. 7 illustrates an exemplary distributed computer and communication system that facilitates determining vulnerability metrics for graph-based configuration security.

FIG. 7 illustrates an exemplary distributed computer and communication system that facilitates determining vulnerability metrics for graph-based configuration security. Computer system 700 includes a processor 702, a memory 704, and a storage device 708. Memory 704 can include a volatile memory (e.g., RAM) that serves as a managed memory, and can be used to store one or more memory pools. Furthermore, computer system 700 can be coupled to peripheral input/output (I/O) user devices 734, e.g., a display device 710, a keyboard 712, and a pointing device 714, and can also be coupled via one or more network interfaces to a network 708. Storage device 706 can store instructions for an operating system 718 and a content processing system 720.

In one embodiment, content processing system 720 can include instructions, which when executed by processor 702 can cause computer system 900 to perform methods and/or processes described in this disclosure. Content processing system 720 can include a communication module 722 for sending and/or receiving/obtaining data packets to/from other network nodes across a computer network. Content processing system 720 can further include instructions implementing a graph module 724 for generating a multi-layer graph for a system with a plurality of interconnected components.

Content processing system 720 can include a SCIBORG metrics determining module 726, which can determine metrics for an overall system based on equations (5)-(10). Content processing system 720 can further include instructions implementing a module 728 for applying the SCIBORG metrics in a multi-layer graph. Specifically, module 728 can apply the exploitation likelihood metric computed based on equation (5) to each node in a vulnerability subgraph, and the probability value, i.e., computed using equations (8) and (9). The probability values can indicate the likelihood of exploiting a vulnerability next in the order for advancing an attack in a multi-step attack on the system. The probability values can be assigned to the edges between the nodes in a vulnerability subgraph, thereby determining a probability distribution across edges between one vulnerability node to multiple vulnerability nodes. These probability distribution values across the edges can facilitate attack analysis and extracting information about which path the attacker may select to advance an attack in a multi-step attack on the system. In one embodiment, the probability values can also be computed for enables edges from a node in the configuration subgraph to a node in the vulnerability subgraph. Furthermore, module 728 can compute an exposure factor based on equation (10), which can indicate a relative damage to an asset in the overall system which was caused due to the exploitation of a vulnerability.

In response to content processing system 720 computing the SCIBORG metrics (module 726) and applying them to a multi-layer graph modeling the overall system (module 728), system 720 can implement a path determination module 730 that can determine the different attack paths based on the SCIBORG metrics. Content processing system 720 can further include instructions to implement a configuration recommendation module 732 that can recommend at least a configuration change in the system based on the likely attack paths determined in module 730, thereby facilitating an optimization of security in the system while preserving functionality.

Some of the vulnerability metrics may rely on information from the NVD and on scores computed based on CVSS. In one embodiment, the system can validate the vulnerability metrics against a Common Weakness Scoring System (CWSS). The NVD is a U.S. government repository of standards-based vulnerability management represented using Security Content Automation Protocol (SCAP), and is maintained by the National Institute of Standards and Technology (NIST). This data enables automation of vulnerability management, security measurement, and compliance. The NVD is built upon and synchronized with a Common Vulnerabilities and Exposures (CVE) list which includes an identification number, a description, and public references for publicly known cybersecurity vulnerabilities.

The CWSS provides a mechanism for prioritizing software weaknesses that are present within software application in a consistent and flexible manner. A Common Weakness Enumeration (CWE) is a system that provides a structured list of defined software and hardware weaknesses. An evaluation of the SCIBORG metrics and associated SCIBORG score against the CWSS indicated a high degree of correlation between CWE score and the SCIBORG score based on the SCIBORG metrics.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
generating a multi-layer graph for a computer system comprising a collective network composed of a plurality of interconnected components, wherein the multi-layer graph comprises a configuration subgraph, a vulnerability subgraph, and a dependency subgraph;
determining, based on the multi-layer graph, a model for a multi-step attack on the computer system, by:
computing, based on a first set of variables and a first set of tunable parameters, a likelihood of exploiting a vulnerability in the computer system; and
computing, based on a second set of variables and a second set of tunable parameters, an exposure factor indicating an impact of exploiting a vulnerability on a utility of an associated component;
determining, based on the model, a set of attack paths that can be used in the multi-step attack; and
mitigating the multi-step attack on the computer system while preserving computer system functionality by modifying, based on the determined set of attack paths, at least one configuration associated with one of the plurality of interconnected components in the computer system or preserving the at least one configuration based on determining that preserving the system functionality outweighs a security impact associated with the determined set of attack paths.

2. The computer-implemented method of claim 1, wherein a respective component of the plurality of interconnected components includes one or more of: a software component; a hardware component; a middleware component; and a networking component.

3. The computer-implemented method of claim 1, wherein the computing, based on the first set of variables and the first set of tunable parameters, the likelihood of exploiting the vulnerability in the computer system involves using an extensible formula with one or more numerator factors and one or more denominator factors; wherein the one or more numerator factors corresponds to a first subset of variables in the first set of variables that contribute to increasing the likelihood of exploiting the respective vulnerability which is denoted as:

$$(1-e^{-c_N \cdot f_N(x_N)});$$

wherein $c_N$ denotes a tunable parameter; $x_N$ denotes a variable; and $f_N(x_N)$ denotes a function of variable $x_N$; and
wherein the one or more denominator factors corresponds to a second subset of variables in the first set of variables that contribute to decreasing the likelihood of exploiting the respective vulnerability which is denoted as:

$$e^{-c_D \cdot f_D(x_D)};$$

wherein $c_D$ denotes a tunable parameter; $x_D$ denotes a variable; and $f_D(x_D)$ denotes a function of variable $x_D$.

4. The computer-implemented method of claim 1, further comprising:
determining, based on the likelihood of exploiting the respective vulnerability in the computer system, a probability value, wherein the probability value represents a label for an edge between two vulnerabilities in the vulnerability subgraph, and wherein the label indicates a relative probability with which the edge or attack path will be traversed in an attack or by an attacker while exploiting the next vulnerability in the multi-step attack;

wherein the vulnerability subgraph includes directed edges between pairs of vulnerability subgraph nodes, wherein a first vulnerability subgraph node includes a set of directed edges to a corresponding subset of vulnerability subgraph nodes, and wherein a respective directed edge from the first vulnerability subgraph node to a node in the subset of vulnerability subgraph nodes indicates a probability of exploiting the second vulnerability subgraph node.

5. The computer-implemented method of claim 4, wherein a set of probabilities corresponding to the set of directed edges represents a probability distribution over the set of directed edges and an attack or an attacker will select one or more of the directed edges to exploit a next vulnerability subgraph node in the subset of vulnerability subgraph nodes.

6. The computer-implemented method of claim 1, wherein the computing, based on the second set of variables and the second set of tunable parameters, the exposure factor indicating the impact of exploiting the vulnerability on the utility of the associated component involves using the following formula:

$$ef(v, h, x) = \frac{0.1 \cdot \text{Impact}(v)}{e^{c \cdot f(x)}};$$

wherein v denotes a vulnerability being exploited; h denotes a component in the computer system; Impact (v) denotes a first variable representing an impact score; denotes a second variable; $e^{c \cdot f(x)}$ denotes a factor contributing to the exposure factor; c denotes a tunable parameter to weight the contribution of the factor $e^{c \cdot f(x)}$ to the exposure factor; and $f(x)$ is a function of variable x; wherein a directed edge from a vulnerability subgraph node to a dependency subgraph node indicates the exposure factor; and wherein the impact of exploiting the vulnerability on the associated component results in a decrease in utility of the component in the computer system.

7. The computer-implemented method of claim 1, wherein the first set of tunable parameters and the second set of tunable parameters are adapted based on an application and an operational context of the computer system; and wherein a respective tunable parameter associated with a respective variable is adjusted to weight a contribution of the respective variable to an overall score.

8. The computer-implemented method of claim 1, further comprising:

displaying, on a screen of a user device, one or more interactive elements which allow the user to:

view the multi-layer graph comprising at least:
the configuration subgraph and generated configuration subgraph nodes;
the vulnerability subgraph and generated vulnerability subgraph nodes;
the dependency subgraph and generated dependency subgraph nodes; and
directed edges between nodes in a same subgraph or between nodes in different subgraphs;

select one or more attack paths; and view an impact of the one or more attack paths executed sequentially or executed concurrently.

9. The computer-implemented method of claim 1, wherein the first set of variables includes one or more of:
a set of known intrusion detection system rules associated with the vulnerability;
an amount of time elapsed since information about vulnerability became public; and
a Common Vulnerability Scoring System exploitability score.

10. The computer-implemented method of claim 1, wherein the second set of variables includes one or more of:
a number of deployed intrusion detection system rules; and
a normalized Common Vulnerability Scoring System impact score.

11. A computer system, comprising:
a processor;
a storage device storing instructions that when executed by the processor cause the processor to perform a method, the method comprising:
generating a multi-layer graph for a composed system comprising a collective network of a plurality of interconnected components, wherein the multi-layer graph comprises a configuration subgraph, a vulnerability subgraph, and a dependency subgraph;
determining, based on the multi-layer graph, a model for a multi-step attack on the composed system, by:
computing, based on a first set of variables and a first set of tunable parameters, a likelihood of exploiting a vulnerability in the composed system; and
computing, based on a second set of variables and a second set of tunable parameters, an exposure factor indicating an impact of exploiting a vulnerability on a utility of an associated component;
determining, based on the model, a set of attack paths that can be used in the multi-step attack; and
mitigating the multi-step attack on the composed system while preserving composed system functionality by modifying, based on the determined set of attack paths, at least one configuration associated with one of the plurality of interconnected components in the composed system or preserving the at least one configuration based on determining that preserving the system functionality outweighs a security impact associated with the determined set of attack paths.

12. The computer system of claim 11, wherein a respective component of the plurality of interconnected components includes one or more of: a software component; a hardware component; a middleware component; and a networking component.

13. The computer system of claim 11, wherein the computing, based on the first set of variables and the first set of tunable parameters, the likelihood of exploiting the vulnerability in the composed system involves using an extensible formula with one or more numerator factors and one or more denominator factors; wherein the one or more numerator factors corresponds to a first subset of variables in the first set of variables that contribute to increasing the likelihood of exploiting the respective vulnerability which is denoted as:

$(1-e^{-c_N \cdot f_N(x_N)})$;

wherein $c_N$ denotes a tunable parameter; $x_N$ denotes a variable; and $f_N(x_N)$ denotes a function of variable $x_N$; and wherein one or more denominator factors corresponding to a second subset of variables in the first set of variables that contribute to decreasing the likelihood of exploiting the respective vulnerability is denoted as:

$e^{-c_D \cdot f_D(x_D)}$;

wherein $c_D$ denotes a tunable parameter; $x_D$ denotes a variable; and $f_D(x_D)$ denotes a function of variable $x_D$.

14. The computer system of claim 11, wherein the method further comprising:
  determining, based on the likelihood of exploiting the respective vulnerability in the composed system, a probability value, wherein the probability value represents a label for an edge between two vulnerabilities in the vulnerability subgraph, and wherein the label indicates a relative probability with which the edge or attack path will be traversed in an attack or by an attacker while exploiting the next vulnerability in the multi-step attack;
  wherein the vulnerability subgraph includes directed edges between pairs of vulnerability subgraph nodes,
  wherein a first vulnerability subgraph node includes a set of directed edges to a corresponding subset of vulnerability subgraph nodes, and
  wherein a respective directed edge from the first vulnerability subgraph node to a node in the subset of vulnerability subgraph nodes indicates a probability of exploiting the second vulnerability subgraph node.

15. The computer system of claim 14, wherein a set of probabilities corresponding to the set of directed edges represents a probability distribution over the set of directed edges and an attack or an attacker will select one or more of the directed edges to exploit a next vulnerability subgraph node in the subset of vulnerability subgraph nodes.

16. The computer system of claim 11, wherein the computing, based on the second set of variables and the second set of tunable parameters, the exposure factor indicating the impact of exploiting the vulnerability on the utility of the associated component involves using the following formula:

$$ef(v, h, x) = \frac{0.1 \cdot \text{Impact}(v)}{e^{c \cdot f(x)}};$$

wherein v denotes a vulnerability being exploited; h denotes a component in the composed system; Impact (v) denotes a first variable representing an impact score; x denotes a second variable; $e^{c \cdot f(x)}$ denotes a factor contributing to the exposure factor; c denotes a tunable parameter to weight the contribution of the factor $e^{c \cdot f(x)}$ to the exposure factor; and $f(x)$ is a function of variable x; wherein a directed edge from a vulnerability subgraph node to a dependency subgraph node indicates the exposure factor; and wherein the impact of exploiting the vulnerability on the associated component results in a decrease in utility of the component in the composed system.

17. The computer system of claim 11, wherein the first set of tunable parameters and the second set of tunable parameters are adapted based on an application and an operational context of the composed system; and wherein a respective tunable parameter associated with a respective variable is adjusted to weight a contribution of the respective variable to an overall score.

18. The computer system of claim 11, wherein the method further comprising:
  displaying, on a screen of a user device, one or more interactive elements which allow the user to:
    view the multi-layer graph comprising at least:
      the configuration subgraph and generated configuration subgraph nodes;
      the vulnerability subgraph and generated vulnerability subgraph nodes;
      the dependency subgraph and generated dependency subgraph nodes; and
      directed edges between nodes in a same subgraph or between nodes in different subgraphs;
    select one or more attack paths; and
    view an impact of the one or more attack paths executed sequentially or executed concurrently.

19. The computer system of claim 11, wherein the first set of variables includes one or more of:
  a set of known intrusion detection system rules associated with the vulnerability;
  an amount of time elapsed since information about vulnerability became public; and
  a Common Vulnerability Scoring System exploitability score.

20. The computer system of claim 11, wherein the second set of variables includes one or more of:
  a number of deployed intrusion detection system rules; and
  a normalized Common Vulnerability Scoring System impact score.

* * * * *